Figure 1:
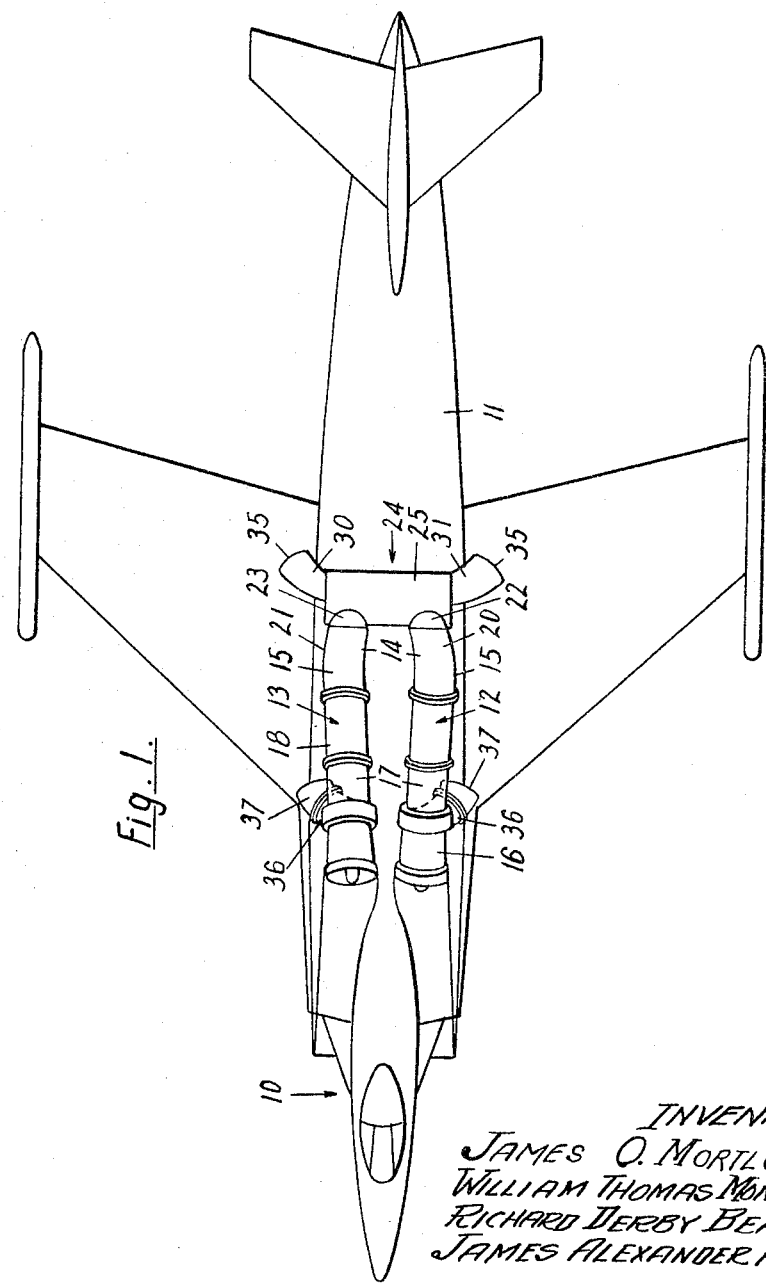

Aug. 16, 1966     J. O. MORTLOCK ET AL     3,266,752
FLUID FLOW APPARATUS
Filed Feb. 17, 1964     2 Sheets-Sheet 1

INVENTORS
JAMES O. MORTLOCK
WILLIAM THOMAS MONAGHAN
RICHARD DERBY BEALE
JAMES ALEXANDER PETRIE

By Cushman Darby & Cushman
Attorneys

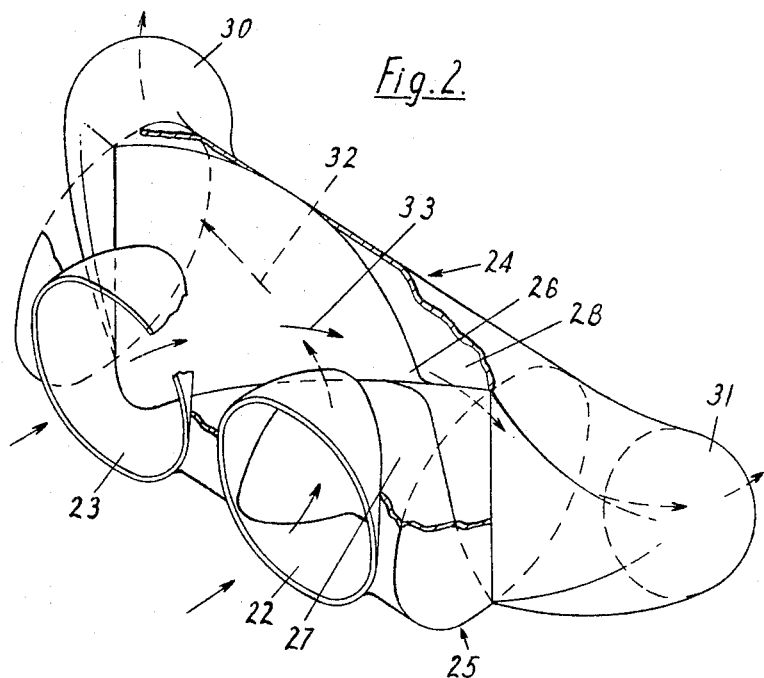

United States Patent Office 3,266,752
Patented August 16, 1966

3,266,752
FLUID FLOW APPARATUS
James Oswald Mortlock, William Thomas Monaghan, Richard Derby Beale, and James Alexander Petrie, Derby, England, assignors to Rolls-Royce Limited, Derby, England, a company of Great Britain
Filed Feb. 17, 1964, Ser. No. 345,390
Claims priority, application Great Britain, Mar. 5, 1963, 8,827/63
11 Claims. (Cl. 244—55)

This invention concerns fluid flow apparatus.

According to the present invention there is provided fluid flow apparatus comprising a cylinder which is provided with an internal, axially extending, helical wall which divides the cylinder into two non-communicating helical compartments, two spaced apart outlet pipes which respectively communicate with different compartments, and two spaced apart inlet pipes which are disposed inwardly of the outlet pipes and which respectively communicate with the said different compartments, the arrangement being such that fluid flowing through each inlet pipe passes to that outlet pipe which is disposed on the further side of the other inlet pipe.

Preferably the two inlet pipes respectively communicate with the said different compartments at points which are spaced from each other by a distance substantially equal to a quarter of the pitch of the helical wall, the two outlet pipes respectively communicating with the said different compartments at points which are spaced from each other by a distance substantially equal to half the pitch of the helical wall.

The two inlet pipes and/or the two outlet pipes may extend substantially parallel to each other.

The invention also comprises fluid flow apparatus as set forth above and two jet propulsion engines one side of each of which faces the respective side of the other engine, each engine having a jet pipe which communicates with or incorporates a said inlet pipe and a said outlet pipe, each said outlet pipe terminating in a final nozzle which is disposed on the other side of the other engine, and each engine having an additional jet nozzle which is disposed on the other side of the respective engine.

Each of the said nozzles is preferably provided with deflector means for varying the direction in which the gases flowing therethrough are directed.

Thus the said deflector means may be such that they may be moved so as to direct the said gases forwardly, rearwardly or downwardly, as desired. The said deflector means may thus comprise a frame member which is rotatably mounted in the jet pipe (or in a duct provided with the additional jet nozzle) and which carries a plurality of jet deflector vanes which extend parallel to each other, means being provided for effecting rotation of the frame member with respect to its jet pipe or duct.

Preferably each engine has a duct which is arranged to receive part of the air compressed by the compressor means of the respective engine and which is provided with the said additional jet nozzle.

If desired the said duct of each engine may incorporate combustion equipment.

The invention also comprises an aircraft provided with power plant as set forth above, the engines being disposed on opposite sides of an axis about which the aircraft may pivot.

The said axis is preferably the longitudinal axis of the aircraft.

The invention is illustrated, merely by way of example, in the accompanying drawings, in which:

FIGURE 1 is a diagrammatic plan view of an aircraft provided with fluid flow apparatus according to the present invention, and FIGURE 2 is a diagrammatic perspective view of the fluid flow apparatus employed in the aircraft of FIG. 1.

Referring to the drawings, a supersonic aircraft 10 has a fuselage 11 on opposite sides of whose longitudinal axis there are mounted two gas turbine jet propulsion engines 12, 13. The engines 12, 13 are arranged so that one side 14 of each of the engines 12, 13 faces towards the other engine while the other side 15 of each engine faces away from the other engine.

Each of the engines 12, 13 comprises in flow series one or more compressors 16, combustion equipment 17, and one or more turbines 18. The engines 12, 13 are, moreover, respectively provided with jet pipes 20, 21.

The jet pipes 20, 21 respectively communicate with, or incorporate, substantially parallel inlet pipes 22, 23 of a fluid flow apparatus 24.

The apparatus 24 comprises a cylinder 25 which is coaxially provided with an internal, axially extending helical wall 26 which divides the cylinder 25 into two non-communicating helical compartments 27, 28. The inlet pipes 22, 23 respectively communicate with the compartments 27, 28 at points which are spaced from each other by a distance equal to a quarter of the pitch of the helical wall 26.

The inlet pipes 22, 23 are disposed inwardly of outlet pipes 30, 31 which respectively communicate with the compartments 27, 28 at points which are spaced from each other by a distance equal to half the pitch of the helical wall 26.

Jet gases passing through the inlet pipe 22 flow through the compartment 27 along a helical route indicated by the arrows 32 so as to pass out through the outlet pipe 30 which, as will be seen from FIG. 2, is disposed on the further side of the other inlet pipe 23.

Similarly, jet gases passing through the inlet pipe 23 flow through the compartment 28 along a helical route indicated by the arrows 33 so as to pass out through the outlet pipe 31 which, as will be seen from FIG. 2, is disposed on the further side of the other inlet pipe 22.

Thus the apparatus 24 permits the jet pipes 20, 21 to cross over each other in a particularly compact manner and in a manner which involves relatively little loss of thrust, since the jet gases have their direction changed very smoothly.

The outlet pipe 30 of the engine 12 terminates in a final outlet nozzle 35 which is disposed on the side 15 of the other engine 13. Similarly, the outlet pipe 31 of the engine 13 terminates in a final outlet nozzle 35 which is disposed on the side 15 of the other engine 12.

Each of the engines 12, 13 also has a duct 36 which is arranged to receive part of the air compressed in the respective compressor or compressors 16 and which terminates in an additional jet nozzle 37, each nozzle 37 being disposed on the side 15 of the respective engine. Each duct 36 may, moreover, incorporate, if desired, combustion equipment (not shown).

Each of the nozzles 35, 37 may, as disclosed in our patent application Serial No. 106,748 comprise a frame member (not shown) which is rotatably mounted in its jet pipe or duct and which carries a plurality of jet deflector vanes (not shown) which extend parallel to each other, means (not shown) being provided for effecting rotation of the frame member with respect to its jet pipe or duct. Such rotation permits the gases passing through the frame member to be forwardly, rearwardly or downwardly directed as desired.

It will be appreciated that the nozzles 37 are disposed wholly to the same side of the said longitudinal axis as their respective engines. The jet pipes 20, 21 however with their outlet pipes 30, 31 respectively cross the said axis, whereby the final outlet nozzles 35 are disposed on the opposite side of the longitudinal axis to that of their respective engines.

Accordingly, if one of the engines 12, 13 should fail, thrust will still be exerted to opposite sides of the said longitudinal axis and there will therefore be relatively little turning moment exerted about the said longitudinal axis.

We claim:

1. Fluid flow apparatus comprising a cylinder, an internal, axially extending, helical wall which is mounted within and divides the cylinder into two non-communicating helical compartments, two spaced apart outlet pipes, each said outlet pipe communicating with a different one of said compartments, and two spaced apart inlet pipes which are disposed inwardly of the outlet pipes, each said inlet pipe communicating with that one of said compartments, which communicates with the outlet pipe which is disposed on the further side of the other inlet pipe.

2. Fluid flow apparatus comprising a cylinder, an internal, axially extending, helical wall which is mounted within and divides the cylinder into two non-communicating helical compartments, two spaced apart outlet pipes, each said outlet pipe communicating with a different one of said compartments, two spaced apart inlet pipes which are disposed inwardly of the outlet pipes and two inlets and two outlets through which the said inlet pipes and outlet pipes respectively communicate with the said different compartments, said inlets being spaced from each other by a distance substantially equal to a quarter of the pitch of the said helical wall, and said outlets being spaced from each other by a distance substantially equal to half the pitch of the helical wall, the arrangement being such that fluid flowing through each inlet pipe passes to that outlet pipe which is disposed on the further side of the other inlet pipe.

3. Fluid flow apparatus comprising a cylinder which is provided with an internal, axially extending, helical wall which is mounted within and divides the cylinder into two non-communicating helical compartments, two spaced apart outlet pipes, each said outlet pipe communicating with a different one of said compartments, and two spaced apart inlet pipes which are disposed inwardly of the outlet pipes, each said inlet pipe communicating with the one of said compartments, which communicates with that outlet pipe which is disposed on the further side of the other inlet pipe, the two inlet pipes and the two outlet pipes extending substantially parallel to each other.

4. A power plant comprising two jet propulsion engines disposed in side by side relation, two jet pipes, each jet pipe connected to a respective one of said jet propulsion engines, fluid flow apparatus disposed downstream of said jet pipes and comprising an internal, axially extending, helical wall which is mounted within and divides the cylinder into two non-communicating helical compartments, two spaced apart inlet pipes which outlet pipe communicating with a different one of said compartments, two spaced apart inlet pipes which are disposed inwardly of the outlet pipes, each said inlet pipe connecting one of said jet pipes to that one of said compartments which communicate with the outlet pipe which is disposed on the further side of the other jet pipe, two final nozzles, each final nozzle communicating with a respective one of said outlet pipes, and two additional nozzles, each additional nozzle being operatively connected to a respective one of said engines and being disposed on that side of the said engine which is remote from the other engine.

5. A power plant as claimed in claim 4 wherein deflector means are provided on each of said final and additional nozzles, each said deflector means respectively varying the direction in which the fluid flowing through the respective nozzle is directed.

6. A power plant as claimed in claim 5, each said deflector means being capable of movement, to control the direction in which fluid flowing through the respective nozzles is directed.

7. A power plant as claimed in claim 6 in which each said deflector means comprises a rotatable frame member, a plurality of jet deflector vanes mounted parallel to each other in each said frame member and means effecting rotation of each said frame member.

8. A power plant comprising two jet propulsion engines disposed in side by side relation, each engine including compressor means and combustion equipment in flow series, two jet pipes, each jet pipe connected to a respective one of said jet propulsion engines, fluid flow apparatus disposed downstream of said jet pipes and comprising an internal, axially extending, helical wall which is mounted within and divides the cylinder into two non-communicating helical compartments, two spaced apart outlet pipes, each said outlet pipe communicating with a different one of said compartments, two spaced apart inlet pipes which are disposed inwardly of the outlet pipes, each said inlet pipe connecting one of said jet pipes to that one of said compartments which communicate with the outlet pipe which is disposed on the further side of the other jet pipe, two final nozzles, each final nozzle communicating with a respective one of said outlet pipes, and two additional nozzles, each additional nozzle communicating with the compressor means of a respective one of said engines and being disposed on that side of the said engine which is remote from the other engine.

9. A power plant as claimed in claim 8 in which each said additional nozzle comprises a duct and combustion equipment mounted within said duct.

10. In an aircraft, power plant comprising two jet propulsion engines the said engines being disposed on opposite sides of an axis about which the aircraft may pivot, two jet pipes, each jet pipe being connected to a respective one of said jet propulsion engines, fluid flow apparatus disposed downstream of said jet pipes and comprising an internal, axially extending, helical wall which is mounted within and divides the cylinder into two non-communicating helical compartments, two spaced apart outlet pipes, each said outlet pipe communicating with a different one of said compartments, two spaced apart inlet pipes which are disposed inwardly of the outlet pipes, each said inlet pipe connecting one of said jet pipes to that one of said compartments which communicate with the outlet pipe which is disposed on the further side of the other jet pipe, two final nozzles, each final nozzle communicating with a respective one of said outlet pipes, and two additional nozzles, each additional nozzle being operatively connected to a respective one of said engines and being disposed on that side of the said engine which is remote from the other engine.

11. In an aircraft, power plant as claimed in claim 10, the said axis being the longitudinal axis of the aircraft.

References Cited by the Examiner

FOREIGN PATENTS 889,540   2/1962   Great Britain.

MILTON BUCHLER, *Primary Examiner.*

L. C. HALL, *Assistant Examiner.*